US010242576B2

(12) United States Patent
Kume et al.

(10) Patent No.: US 10,242,576 B2
(45) Date of Patent: Mar. 26, 2019

(54) OBSTACLE DETECTION DEVICE

(71) Applicant: CLARION CO., LTD., Saitama-shi, Saitama (JP)

(72) Inventors: Hideyuki Kume, Tokyo (JP); Masahiro Kiyohara, Tokyo (JP); Kimiyoshi Machii, Tokyo (JP); Noriyasu Hasejima, Tokyo (JP); Yoshitaka Uchida, Saitama (JP); Takehito Ogata, Saitama (JP); Yuta Ohizumi, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 15/767,884

(22) PCT Filed: Nov. 1, 2016

(86) PCT No.: PCT/JP2016/082400
§ 371 (c)(1),
(2) Date: Apr. 12, 2018

(87) PCT Pub. No.: WO2017/078001
PCT Pub. Date: May 11, 2017

(65) Prior Publication Data
US 2018/0308364 A1    Oct. 25, 2018

(30) Foreign Application Priority Data
Nov. 2, 2015 (JP) .................................. 2015-215752

(51) Int. Cl.
*G08G 1/16* (2006.01)
*B62D 15/02* (2006.01)
(Continued)

(52) U.S. Cl.
CPC ............. *G08G 1/168* (2013.01); *B60R 21/00* (2013.01); *B62D 15/027* (2013.01); *G08G 1/141* (2013.01); *G08G 1/166* (2013.01)

(58) Field of Classification Search
CPC ...... H04R 2420/01; G08B 21/02; H04M 1/05
See application file for complete search history.

(56) References Cited

U.S. PATENT DOCUMENTS

| | | | | |
|---|---|---|---|---|
| 2004/0119610 A1* | 6/2004 | Maemura | ............... | B60Q 9/005 340/932.2 |
| 2011/0006917 A1* | 1/2011 | Taniguchi | ............ | B62D 15/028 340/932.2 |
| 2013/0085640 A1* | 4/2013 | Hong | ................. | B62D 15/0285 701/41 |

FOREIGN PATENT DOCUMENTS

| | | |
|---|---|---|
| JP | 2004-108944 A | 4/2004 |
| JP | 2009-101989 A | 5/2009 |

(Continued)

OTHER PUBLICATIONS

International Search Report for 2017/078001 A1, dated Jan. 24, 2017.

*Primary Examiner* — Fabricio R Murillo Garcia
(74) *Attorney, Agent, or Firm* — Volpe and Koenig, P.C.

(57) ABSTRACT

The obstacle detection device comprises: a first camera installed on a moving vehicle used for photographing a frontward or rearward view of the vehicle; a second camera installed on the vehicle used for photographing a sideward view of the vehicle; a parking space detection unit for detecting a parking space on the basis of an image obtained by photographing by the first camera; a memory unit for storing a real-space area of the parking space; a motion acquisition unit for acquiring information about behaviors of the vehicle; an obstacle calculation unit for calculating information about an obstacle present in the vicinity of the (Continued)

parking space on the basis of multiple images obtained by photographing by the second camera at different points in time; and a processing area setting unit for controlling, the calculation by the obstacle calculation unit.

9 Claims, 15 Drawing Sheets

(51) Int. Cl.
      *G08G 1/14*    (2006.01)
      *B60R 21/00*   (2006.01)

(56) References Cited

FOREIGN PATENT DOCUMENTS

| | | |
|---|---|---|
| JP | 2010-208358 A | 9/2010 |
| JP | 2012-040883 A | 3/2012 |

\* cited by examiner

FIG. 2

| RECORD NUMBER | PARKING SPACE INFORMATION |
|---|---|
| | VERTEX COORDINATES OF PARKING SPACE INFORMATION |
| 1 | (x11,y11), (x12,y12), (x13,y13), (x14,y14) |
| 2 | (x21,y21), (x22,y22), (x23,y23), (x24,y24) |
| 3 | (x31,y31), (x32,y32), (x33,y33), (x34,y34) |

12a

OBSTACLE DETECTION DEVICE

TECHNICAL FIELD

The invention relates to an obstacle detection device.

BACKGROUND ART

In parking support of a vehicle, it is necessary to detect an obstacle in order to move the vehicle to a target position and to avoid collision with the obstacle. PTL 1 discloses a parking support device in which marks having predetermined positional relationships with a parking section are provided and that determines whether a vehicle stops at a target initial stop position on the basis of a captured image of the marks and detects an obstacle when it is determined that the vehicle stops at the target initial stop position.

CITATION LIST

Patent Literature

PTL 1: JP 2010-208358 A

SUMMARY OF INVENTION

Technical Problem

In the invention described in PTL 1, since reduction of a calculation process load is not considered after the vehicle stops at a predetermined position and detection of an obstacle is started, a process load for calculating obstacle information increases enormously.

Solution to Problem

According to a first aspect of the present invention, an obstacle detection device includes: a first camera mounted in a moving vehicle and configured to image a forward view or a rearward view of the vehicle; a second camera mounted in the vehicle and configured to image a sideward view of the vehicle; a parking space detection unit configured to detect a parking space for the vehicle on the basis of an image acquired from the first camera by imaging; a memory unit configured to store a real-space area of the parking space detected by the parking space detection unit; a motion acquisition unit configured to acquire information on behavior of the vehicle; an obstacle calculation unit configured to calculate information on an obstacle which is present near the parking space on the basis of a plurality of images which are acquired from the second camera by imaging at different times; and a processing area setting unit configured to control the calculation in the obstacle calculation unit on the basis of the real-space area of the parking space stored in the memory unit and the information on behavior of the vehicle acquired by the motion acquisition unit.

Advantageous Effects of Invention

According to the invention, it is possible to reduce a process load for calculating obstacle information.

BRIEF DESCRIPTION OF DRAWINGS

FIG. 2 is a diagram illustrating an example of a parking space information area 12a.

DESCRIPTION OF EMBODIMENTS

First Embodiment

Hereinafter, an obstacle detection device according to a first embodiment will be described with reference to FIGS. 1 to 7.

(Configuration)

Figure 1:
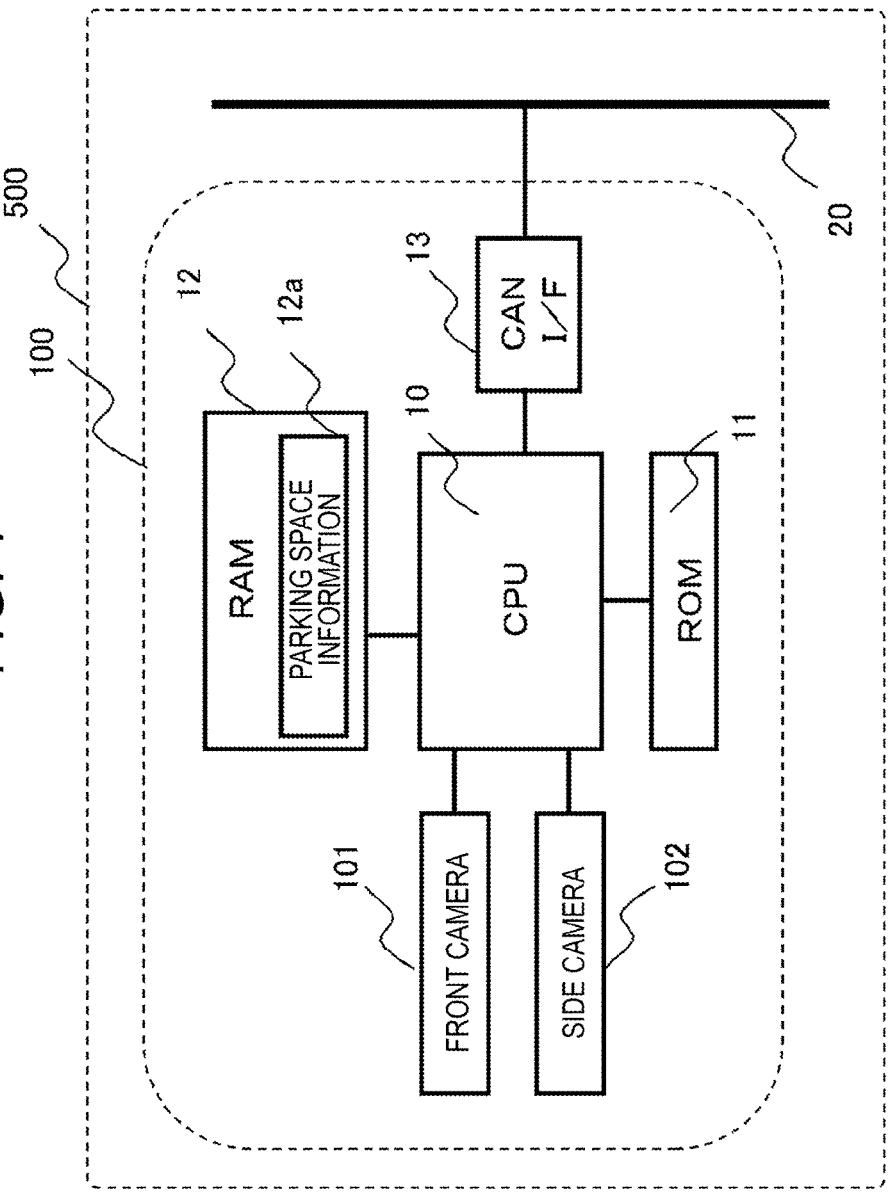
FIG. 1 is a diagram illustrating a configuration of an obstacle detection device 100.

FIG. 1 is a diagram illustrating a configuration of an obstacle detection device 100 which is incorporated in a vehicle 500. The vehicle 500 includes a CAN bus 20, and the obstacle detection device 100 is connected to the CAN bus 20. Other devices which are not illustrated are connected to the CAN bus 20. That is, a device that outputs a traveling direction of the vehicle to the CAN bus 20, a device that outputs a speed of the vehicle to the CAN bus 20, and a device that controls the vehicle 500 on the basis of obstacle information output from the obstacle detection device 100 are connected to the CAN bus 20.

The obstacle detection device 100 includes a front camera 101, a side camera 102, a CPU 10, a ROM 11, a RAM 12, and a CAN interface 13.

The front camera 101 is mounted in a front-upper part of the vehicle 500 and images a forward view of the vehicle 500. The side camera 102 is mounted on a left surface of the vehicle 500 and images a left view of the vehicle 500.

The CPU 10 calculates obstacle information from images acquired from the front camera 101 and the side camera 102 by photographing using a program which will be described later for every predetermined period, for example, every 0.1 seconds. The calculated obstacle information is output to the CAN bus 20 via the CAN interface 13. In the following description, the predetermined period is referred to as a "process period".

Programs and camera parameters of the front camera 101 and the side camera 102 are stored in the ROM 11. The programs are loaded from the ROM 11 to the RAM 12 and are executed by the CPU 10. The camera parameters are intrinsic parameters such as lens distortion and extrinsic parameters such as mounting positions and angles of the cameras in the vehicle. A parking space information area 12a or other information which is required for execution of the programs is temporarily stored in the RAM 12. The parking space information area 12a will be described later.

The CAN interface 13 is a communication interface for communication with the CAN bus 20 of the obstacle detection device 100. The obstacle detection device 100 acquires motion information of the vehicle 500, that is, information on a traveling direction and a speed of the vehicle 500, via the CAN interface 13. The obstacle detection device 100 outputs the calculated obstacle information to the CAN bus 20 via the CAN interface 13.

(Parking Space Information Area)

The parking space information area 12a is a predetermined area of the RAM in which information on a parking space detected by a parking space detection unit 103 which will be described later is stored. Information on a parking space is a position and a posture of a parking space relative to the host vehicle in the real space. The position and the posture of the parking space which are output are expressed, for example, as combinations of coordinates of a plurality of vertices constituting the parking space. Alternatively, the position and the posture of the parking space may be expressed as combinations of center coordinates of the parking space, the size of the parking space, and the slope of the parking space about the host vehicle.

FIG. 2 is a diagram illustrating an example of information on a parking space which is stored in the parking space information area 12a. In the example illustrated in FIG. 2, three-records, that is, information on three parking spaces, are stored in the parking space information area 12a. In this example, a parking space is expressed as a combination of coordinates of a plurality of vertices constituting the parking space. The coordinates represent a coordinate system centered on the host vehicle, that is, a relative position.

(Functional Blocks)

Figure 3:
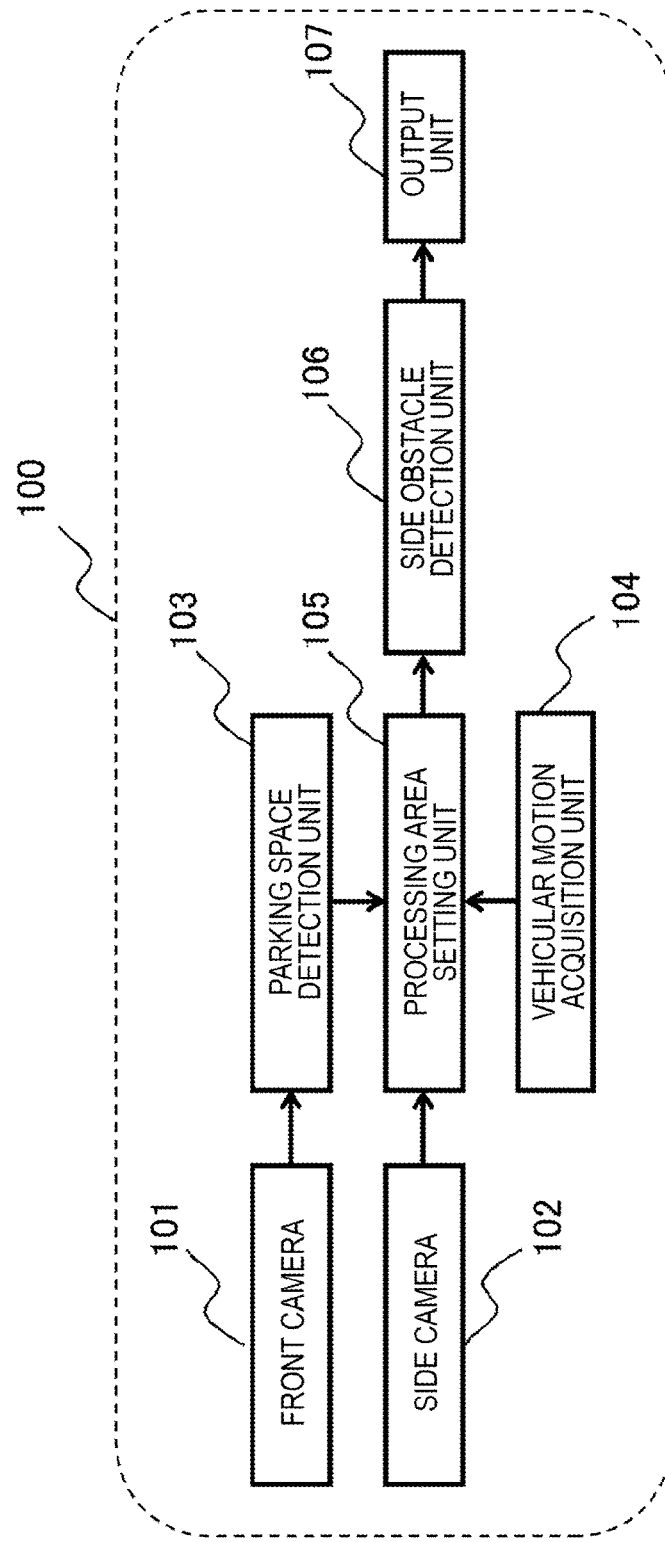
FIG. 3 is a functional block diagram illustrating functions of a program which is executed by the obstacle detection device 100.

FIG. 3 is a functional block diagram illustrating functions of a program which is executed by the CPU 10 of the obstacle detection device 100. That is, the obstacle detection device 100 includes a parking space detecting function of the parking space detection unit 103, a vehicle motion acquiring function of the vehicular motion acquisition unit 104, a processing area setting function of the processing area setting unit 105, a side obstacle detecting function of the side obstacle detection unit 106, and an output function of the output unit 107 by a program which is executed by the CPU 10. The obstacle detection device 100 causes the front camera 101 and the side camera 102 to capture an image for every predetermined period, that is, every process period, and performs processing of the functional blocks when images are acquired by imaging. Specifically, the parking space detection unit 103 starts its processing when an image is acquired from the front camera 101 by imaging, the processing area setting unit 105 starts its process when the processing of the parking space detection unit 103 is completed, and the side obstacle detection unit 106 starts its processing when the processing of the processing area setting unit 105 is completed. That is, the functional blocks operate every process period.

The parking space detection unit 103 detects a parking space which is present in the front of the host vehicle from an image acquired from the front camera 101 by imaging, and adds information on the detected parking space to the parking space information area 12a. Detection of a parking space means, for example, that white lines are detected from an image and an area between two white lines is detected as a parking space. Alternatively, detection of a parking space means that an obstacle is detected from an image and an area in which no obstacle is present is detected as a parking space. The same process routine as in the side obstacle detection unit 106 which will be described later can be used for detection of an obstacle.

The vehicular motion acquisition unit 104 acquires information on a motion of the vehicle 500, that is, information on a traveling direction or a speed of the vehicle 500, via the CAN interface 13. Then, the vehicular motion acquisition unit calculates a moving distance of the vehicle 500 from a previous process period to a current process period and outputs the calculated moving distance to the processing area setting unit 105. As the motion information of the vehicle 500, information which is output from a wheel encoder that is mounted in the vehicle 500 to acquire an amount of rotation of a wheel and a steering angle is acquired via the CAN bus 20. By performing calculation based on a geometric model of the vehicle on the basis of the information, the moving distance of the vehicle, for example, 2 m to right or 0.5 m to front, is calculated. Alternatively, output values of sensors that can acquire posture and position information such as an acceleration or angular acceleration meter or a GPS which is mounted in the vehicle 500 may be acquired via the CAN bus 20 and the moving distance of the vehicle may be calculated.

The processing area setting unit 105 sets a processing area C which is an area in an image and which will be processed by the side obstacle detection unit 106 in a subsequent stage. The processing area C is set on the basis of information which is output from the parking space detection unit 103 and is stored in the parking space information area 12a of the RAM and an output of the vehicular motion acquisition unit 104, that is, motion information of the vehicle. When the processing area C is blank, that is, the processing area C is set not to be present, as will be described later, the side obstacle detection unit 106 does not perform its processing.

The side obstacle detection unit 106 performs the following processing on a plurality of images acquired from the side camera 102 by imaging at different times. That is, the processing area C which is set as described above is specified in an image acquired in the current process period, an obstacle which is present beside the host vehicle is detected using image information with luminance included in the processing area C and image information with luminance included in an image acquired in a previous process period, and a relative position to the obstacle is output. When the processing area C is set to be blank by the processing area setting unit 105, the side obstacle detection unit 106 does not perform its processing. Details of the processing will be described later.

The output unit 107 outputs the obstacle detection result to the CAN bus 20 via the CAN interface 13.

(Operation of Processing Area Setting Unit)

Figure 4:
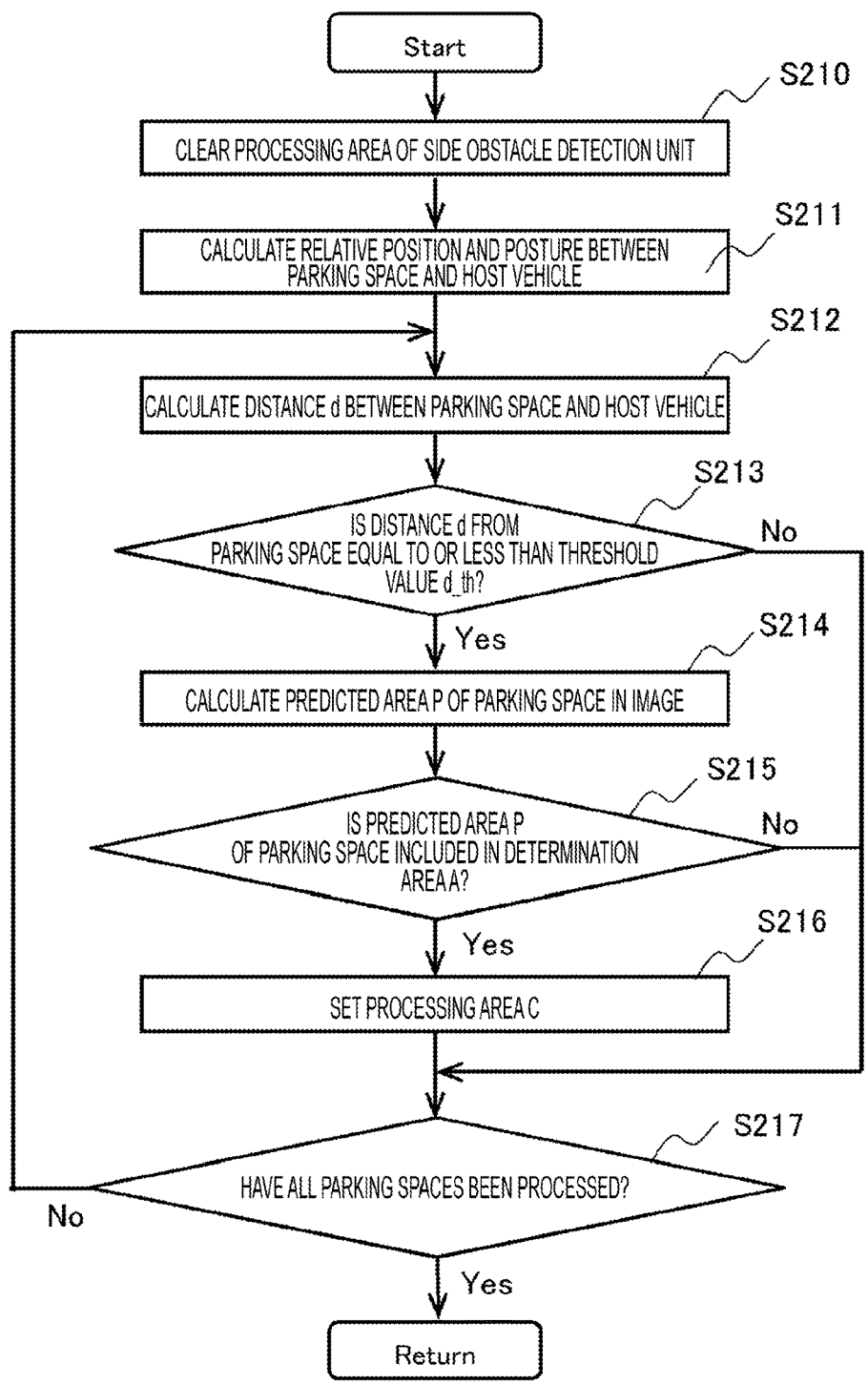
FIG. 4 is a flowchart illustrating a process routine which is performed by a processing area setting unit 105.

Process details of the processing area setting unit 105 will be described below with reference to FIGS. 4 to 6. FIG. 4 is a flowchart illustrating a process routine which is performed by the processing area setting unit 105. The steps which will be described below are performed by the CPU 10.

In step S210, the processing area C is cleared and the processing area C is set to be blank. Accordingly, when the processing area C is not set in step S216 which will be described later, the side obstacle detection unit 106 does not calculate a three-dimensional position. Then, step S211 is performed.

In step S211, information stored in the parking space information area 12*a* of the RAM 12 is updated using the moving distance of the vehicle from an immediately previous process period to the current process period which is output from the vehicular motion acquisition unit 104. Here, information on a parking space which is output from the parking space detection unit 103 is used as a parking space which is detected by the parking space detection unit 103 without any changes in the current process period. Then, step S212 is performed. The processes of step S212 and steps subsequent thereto are repeatedly performed on each parking space stored in the parking space information area 12*a*. When step S212 is performed at the first time, a record in the head stored in the parking space information area 12*a* is processed.

In step S212, a distance d between the parking space and the host vehicle is calculated from the relative position and posture between the parking space and the host vehicle, and then step S213 is performed.

Figure 5:
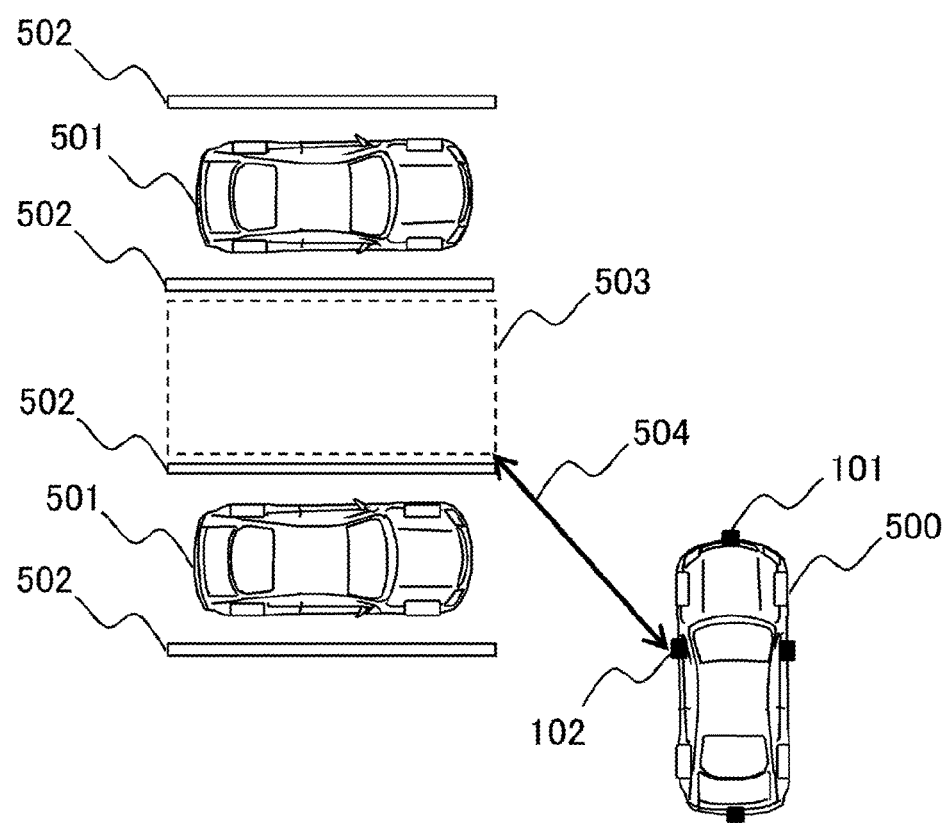
FIG. 5 is a diagram illustrating an example of a distance d between a parking space and a host vehicle.

FIG. 5 is a diagram illustrating an example of a distance d between a parking space and a host vehicle. Parked vehicles 501 which are parked between white lines 502 are present in the vicinity of the host vehicle. A parking space 503 is detected by the parking space detection unit 103. The position of the parking space 503 is defined as a position which is closest to the host vehicle 500 in the parking spaces and the position of the host vehicle is defined as a position of the side camera 102. A distance 504 between the position of the parking space 503 and the position of the host vehicle is calculated and the calculated distance is set as the distance d.

In this example, the position of the left camera is used as the position of the host vehicle, but the position of the host vehicle is not limited thereto and may be, for example, the center of the host vehicle. The position closest to the host vehicle is used as the position of the parking space, but the position of the parking space is not limited thereto and may be, for example, the center of the parking space.

The flowchart illustrated in FIG. 4 will be described subsequently below.

In step S213, it is determined whether the distance d between the parking space and the host vehicle is equal to or less than a preset threshold value d_th. Step S214 is performed when it is determined that the distance d is equal to or less than the threshold value d_th, and step S217 is performed when it is determined that the distance d is greater than the threshold value d_th.

In step S214, a predicted area P which is an area in which a parking space and the periphery of the parking space are predicted to appear is calculated in an image acquired from the side camera 102 by imaging. The predicted area P can be calculated by projection calculation based on a perspective projection model using the relative position and posture between the parking space and the host vehicle and extrinsic and intrinsic parameters of the side camera 102. Then, step S215 is performed.

In step S215, it is determined whether the overall predicted area P calculated in step S214 is present in a preset determination area A. The determination area A is defined as follows. An edge portion of an image which is acquired from the side camera 102 by imaging has a large distortion. Accordingly, an area except the edge portion of the image is defined as the determination area A. When it is determined that the overall predicted area P is present in the determination area A, step S216 is performed. When it is determined that a part of the predicted area P is not present in the determination area A or the predicted area P and the determination area A do not overlap each other, step S217 is performed.

Figure 6:
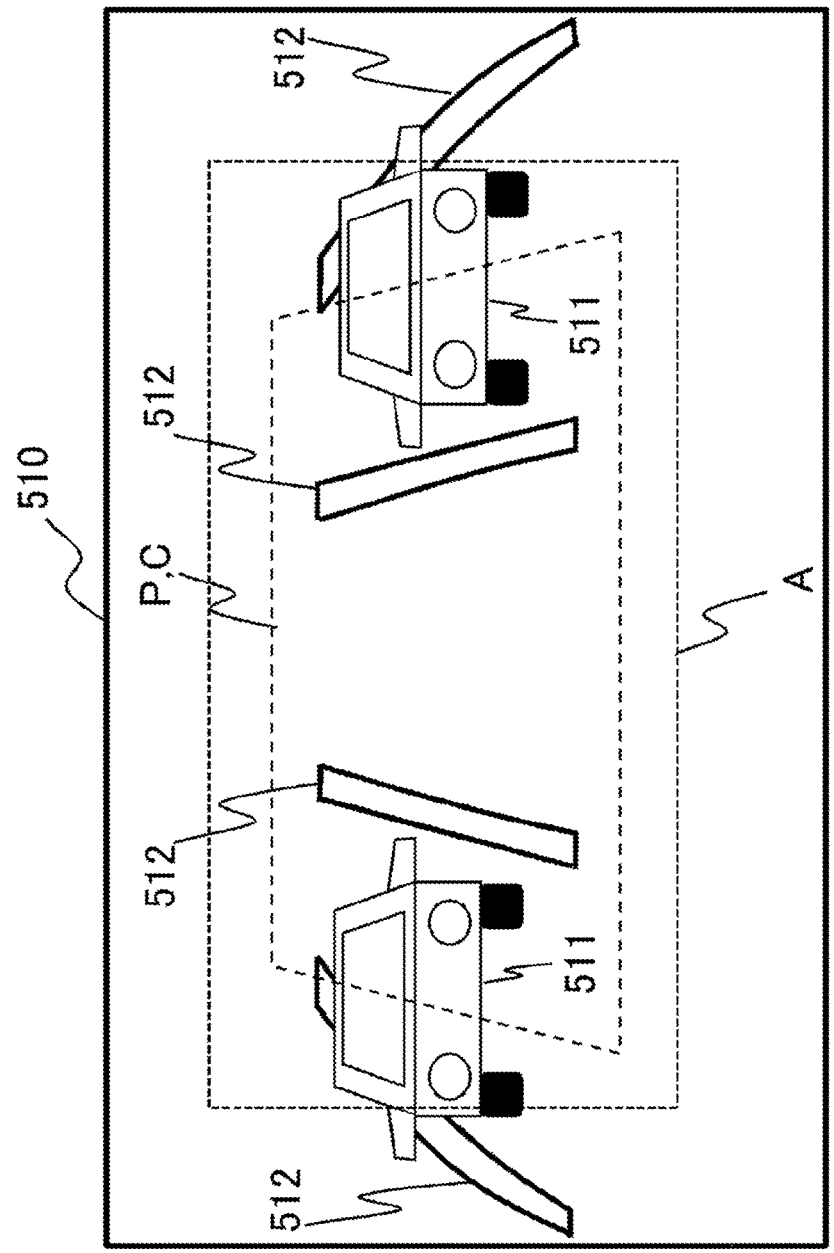
FIG. 6 is a diagram illustrating an example of a predicted area P and a determination area A.

FIG. 6 is a diagram illustrating an example of a predicted area P and a determination area A. In this example, parked vehicles 511 and white lines 512 appear in an image 510 which is acquired from the side camera 102 by imaging. In step S214, the predicted area P which is an area in which a parking space and the periphery of the parking space are predicted to appear is calculated by projection calculation. In step S215, it is determined whether the predicted area P is present in the preset determination area A. In the example illustrated in FIG. 6, since the overall predicted area P is present in the determination area A, step S216 is performed. Description will be continued below with reference back to FIG. 4.

In step S216, the predicted area P calculated in step S214 is set as the processing area C. Here, an area broader than the predicted area P may be set as the processing area C in consideration of a detection position of the parking space, a moving distance of the vehicle, and a calibration error. Then, step S217 is performed.

In step S217, it is determined whether all records stored in the parking space information area 12*a* of the RAM 12 have been processed. The process routine which is illustrated in the flowchart of FIG. 4 ends when it is determined that all the records have been processed, and step S212 is performed again when it is determined that a non-processed record remains.

For example, when a plurality of records are stored in the parking space information area 12*a*, predicted areas P corresponding to the records are calculated and an area in which all the predicted areas are mixed may be set as the processing area C.

(Operation of Side Obstacle Detection Unit)

Details of the process routine which is performed by the side obstacle detection unit 106 will be described below with reference to FIG. 7.

Figure 7:
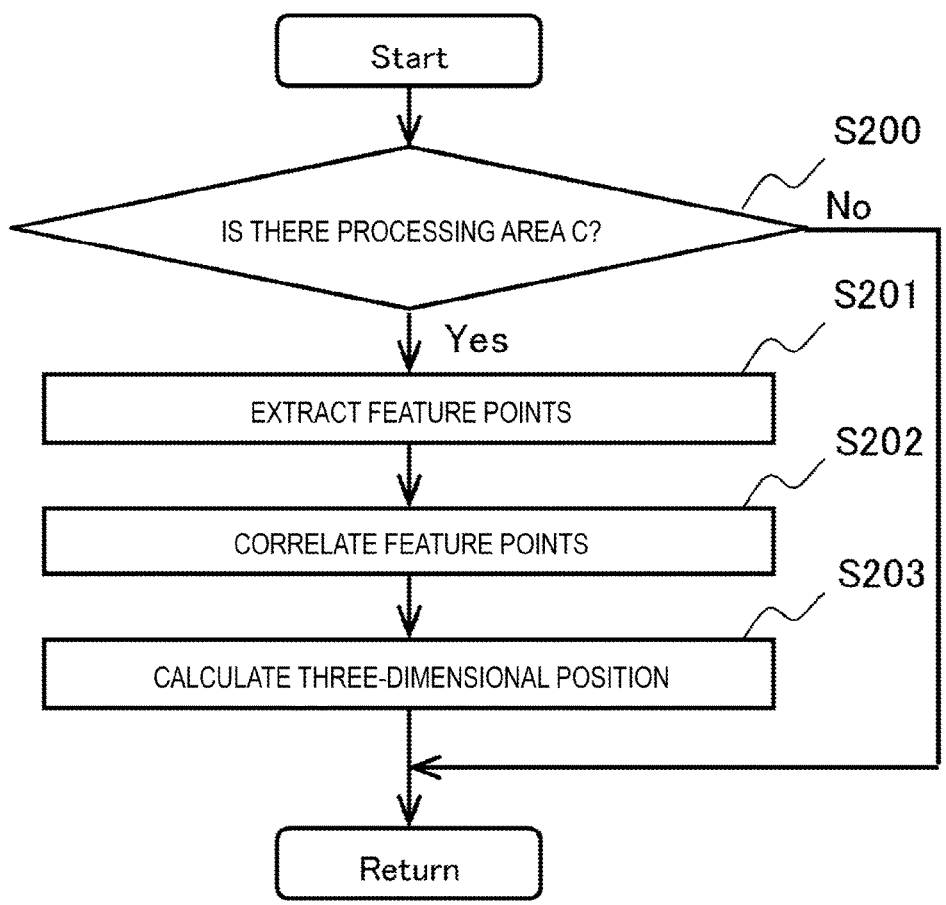
FIG. 7 is a flowchart illustrating a process routine which is performed by a side obstacle detection unit 106.

FIG. 7 is a flowchart illustrating a process routine which is performed by the side obstacle detection unit 106. The side obstacle detection unit 106 calculates a three-dimensional position of a side obstacle on the basis of an image acquired from the side camera 102 by imaging and the processing area C set by the processing area setting unit 105. The steps which will be described below are performed by the CPU 10.

In step S200, it is determined whether a processing area C is present. In the side obstacle detection unit 106, when step S216 has not been performed after the processing area C has been cleared in step S210, a processing area C is not present. Step S201 is performed when it is determined that a processing area C is present, and the process routine which is illustrated in the flowchart of FIG. 7 ends when it is determined that a processing area C is not present.

In step S201, a feature point is extracted from an area included in the processing area C in an image acquired from the side camera 102 by imaging in the current process period. The feature point extracted in this step is used for next steps. Extraction of a feature point can be performed, for example, using Harris' corner detecting method (C.

Harris and M. Stephens: "A combined corner and edge detector," Proc. Alvey Vision Conf., pp. 147-151, 1988.) of extracting a point (a feature point), which has a large difference from neighboring points in an image and can be easily correlated, from a corner or an edge. Then, step S202 is performed.

In step S202, a point corresponding to the feature point extracted in step S201 is retrieved from the image from the side camera 102 before n periods. An arbitrary value is set in advance as n. Alternatively, a period which is required for movement of a preset distance may be set depending on a moving distance of the vehicle which is acquired from the vehicular motion acquisition unit 104.

When the corresponding point is retrieved from the image from the side camera 102 before n periods, the point is determined to be an obstacle.

Here, it is considered that a position of a feature point in an image does not vary greatly between images which are continuous over time and which are acquired before and after movement of the vehicle. Therefore, efficient retrieval can be performed by searching surroundings of the position at which the feature point has been extracted. Simply, a constant range centered on the position at which the feature point has been extracted is set as a search range and then retrieval is performed. An image pattern in the vicinity centered on the position of the feature point is used for the retrieval, and a pattern most similar to the image pattern is retrieved from the search range. As a criterion for similarity, a sum of squared difference (SSD), a sum of absolute difference (SAD), a normalized cross-correlation (NCC), or the like can be used.

Instead of setting the search range, an LK method of setting the position at which a feature point has been extracted as an initial value and retrieving a point at which an SSD value is the smallest in the vicinity of the initial value by repeated calculation (Bruce D. Lucas and Takeo Kanade. An Iterative Image Registration Technique with an Application to Stereo Vision. Int. Joint Conf. on Artificial Intelligence, pp. 674-679, 1981.) can be used. Regarding the LK method, a correlation can be achieved at a high speed and with high accuracy when a motion between images is small, and the LK method is suitable for correlation of temporally continuous images which are imaged by a moving object.

In step S203, a three-dimensional position of the feature point correlated in step S202 is calculated. A three-dimensional position of a feature point can be calculated on the basis of the principle of triangulation using positions of the feature point in images of the current process period and a process period before n periods, the intrinsic parameters of the side camera 102, and a moving distance of the side camera 102 in n periods.

Here, the moving distance of the side camera 102 can be calculated from a moving distance of the vehicle which is acquired by the vehicular motion acquisition unit 104 and mounting position and angle of the side camera 102 with respect to the vehicle. Alternatively, a structure from motion (SfM) method of calculating relative position and posture of a camera on the basis of correlation results of feature points and intrinsic parameters of the camera may be used.

The side obstacle detection unit 106 detects a side obstacle as a three-dimensional point group through the process of step S203. For example, by coupling points close in the acquired three-dimensional point group, a side obstacle may be detected. When the height of the detected obstacle is equal to or less than a predetermined value, the obstacle does not interfere with traveling of the vehicle and thus may be excluded from the obstacle.

In this way, the process routine which is illustrated in the flowchart of FIG. 5 ends.

According to the first embodiment, the following operational advantages are obtained.

(1) The obstacle detection device 100 includes: a first camera, that is, the front camera 101, mounted in a moving vehicle 500 and configured to image a forward view of the vehicle; a second camera, that is, the side camera 102, mounted in the vehicle 500 and configured to image a leftward view of the vehicle; a parking space detection unit 103 configured to detect a parking space for the vehicle on the basis of an image acquired from the first camera by imaging; a memory unit, that is, the RAM 12, configured to store a real-space area of the parking space detected by the parking space detection unit 103 in a parking space information area 12a; a vehicular motion acquisition unit 104 configured to acquire information on behavior of the vehicle 500; an obstacle calculation unit, that is, the side obstacle detection unit 106, configured to calculate information on an obstacle which is present near the parking space on the basis of a plurality of images which are acquired from the side camera 102 by imaging at different times; and a processing area setting unit 105 configured to control the calculation in the obstacle calculation unit on the basis of the real-space area of the parking space stored in the memory unit and the information on behavior of the vehicle 500 acquired by the motion acquisition unit.

In the obstacle detection device 100, the processing area setting unit 105 controls the side obstacle detection unit 106 on the basis of the parking space which is detected from an image acquired from the front camera 101 by imaging and the vehicle motion information on translation or rotation of the vehicle 500. Accordingly, it is possible to reduce a process load for calculating obstacle information which is performed by the side obstacle detection unit 106.

(2) The processing area setting unit 105 calculates a real-space distance between the parking space and the vehicle 500 on the basis of the real-space area of the parking space stored in the memory unit and the information on behavior of the vehicle acquired by the motion acquisition unit and determines that the obstacle calculation unit does not perform the calculation when the distance is greater than a predetermined distance (step S213 in FIG. 4).

Accordingly, when the distance between the side camera 102 and the parking space is large, it is possible to prohibit the side obstacle detection unit 106 from performing the operation of calculating an obstacle (NO in step S200 in FIG. 7) by not setting the processing area C and to reduce a process load for calculating obstacle information. This is because, when the distance between the side camera 102 and the parking space is large, the parking space appears small in the image acquired from the side camera 102 by imaging and it is considered that it is difficult to calculate obstacle information using such an image or the obstacle information is calculated with low accuracy.

(3) The processing area setting unit 105 calculates a real-space area of the parking space, that is, the predicted area P, in the image acquired from the side camera 102 by imaging on the basis of the real-space area of the parking space stored in the memory unit and the information on behavior of the vehicle 500 acquired by the vehicular motion acquisition unit 104 and determines whether the obstacle calculation unit has to perform the calculation on the basis of the relationship between the predicted area P and a predetermined determination area A in the image (step S215 in FIG. 4).

Accordingly, since an area except an edge portion in the image acquired from the side camera 102 by imaging is set as the determination area A, the processing area C is not set when the predicted area P is not included in the determination area A, and it is thus possible to reduce a process load for calculating the obstacle information.

(4) The processing area setting unit 105 sets an area included in the determination area A in the image acquired from the second camera by imaging as the processing area C when an area of the parking space, that is, at least a part of the predicted area P, in the image acquired from the second camera by imaging is included in the determination area A. The processing area setting unit 105 causes the side obstacle detection unit 106 to perform the calculation using image information with luminance or the like included in the processing area C.

Accordingly, since the side obstacle detection unit 106 calculates obstacle information using an image included in the determination area A with small distortion, it is possible to obtain obstacle information with high accuracy.

(5) The processing area setting unit 105 sets an area in which the determination area A and the predicted area P overlap each other as the processing area C in the image acquired from the second camera by imaging, when an area of the parking space, that is, at least a part of the predicted area P, in the image acquired from the second camera by imaging is included in the determination area A. The processing area setting unit 105 causes the side obstacle detection unit 106 to perform the calculation using image information with luminance or the like included in the processing area C.

Accordingly, since only an area with small distortion in which the parking space on which it is intended to acquire information appears is set as the processing area C, it is possible to reduce a process load for calculating obstacle information and to obtain obstacle information with high accuracy.

Modified Example 1

In the first embodiment, the cameras are attached to the front part and the left part of the vehicle 500. However, the number of cameras and the mounting positions of the cameras are not limited thereto.

The obstacle detection device 100 may include a camera that images a rearward view of the vehicle 500 instead of the front camera 101 that images a front view of the vehicle 500, or may include a camera that images a rearward view of the vehicle 500 in addition to the front camera 101.

When the camera that images a rearward view of the vehicle 500 is provided instead of the front camera 101, the processes described in the first embodiment are performed using an image acquired from the camera that images the rearward view of the vehicle 500 by imaging instead of the image acquired from the front camera 101 by imaging.

When the camera that images a rearward view of the vehicle 500 is provided in addition to the front camera 101, the processes described in the first embodiment may be individually performed on images acquired from the cameras by imaging. The cameras may be selectively used depending on the traveling direction of the vehicle 500, an image acquired from the front camera 101 by imaging is used when the vehicle 500 moves forward, and an image acquired from the camera that images a rearward view of the vehicle 500 may be used when the vehicle 500 moves rearward. In order to realize this modified example, it is necessary to add the following functions to the obstacle detection device 100. Examples of the functions include a function of determining whether the vehicle moves forward or rearward and a function of switching an obstacle detection target image between a forward image and a rearward image depending on forward movement or rearward movement which is the determination result.

The obstacle detection device 100 may include a camera that images a rightward view of the vehicle 500 instead of the side camera 102 that images a leftward view of the vehicle 500 or may include the camera that images a rightward view of the vehicle 500 in addition to the side camera 102. Selective use of the side camera 102 and the camera that images a rightward view of the vehicle 500 is the same as the selective use of the front camera 101 and the camera that images a rearward view of the vehicle 500. In order to realize the modified example, it is necessary to add the following functions to the obstacle detection device 100. Examples of the functions include a function of determining on which side of the right and left of the vehicle a parking space is present using a forward image and a rearward image and a function of switching an obstacle detection target image between a rightward image and a leftward image depending on the side on which the parking space is present as the determination result.

Modified Example 2

In the first embodiment, the obstacle detection device 100 is connected to another device via the CAN bus 20 of the vehicle 500. However, the connection relationship of the obstacle detection device 100 to another device is not limited thereto.

The obstacle detection device 100 may be connected to another device via a communication bus other than the CAN bus or may be connected directly to another device without passing through a communication bus. The obstacle detection device 100 may be incorporated into a camera device, a combined controller, or the like.

Modified Example 3

The processing area setting unit 105 sets the predicted area P as the processing area C when the overall predicted area P is present in the determination area A (YES in step S215 and step S216 in FIG. 4). However, the method of setting the processing area C is not limited thereto.

When the overall predicted area P is present in the determination area A, the processing area setting unit 105 may set the overall determination area A as the processing area C or may set an overall image acquired from the side camera 102 by imaging as the processing area C.

When at least a part of the predicted area P is present in the determination area A, the processing area setting unit 105 may set the predicted area P as the processing area C, may set the determination area A as the processing area C, may set an area in which the determination area A and the predicted area P overlap each other as the processing area C, or may set an overall image acquired from the side camera 102 by imaging as the processing area C.

Modified Example 4

The threshold value d_th for the distance (step S213 in FIG. 4) which is used for the processes which are performed by the processing area setting unit 105 may be set to infinity, the processing area C of the side obstacle detection unit 106 may be set using only the predicted area P of the parking space regardless of the distance, and an overall image acquired from the side camera 102 may be set as the determination area A.

By preparing a plurality of combinations of the threshold value d_th for the distance and the determination area A and repeatedly performing the processes of steps S213 to S217 on the plurality of combinations, the processing area C of the side obstacle detection unit 106 may be set. Accordingly, for example, when the distance between the host vehicle and a parking space is large but the parking space is predicted to appear at the center of an image acquired from the side camera 102, setting may be performed such that the processes are performed by the side obstacle detection unit 106.

Modified Example 5

In the first embodiment, the method of detecting a side obstacle using calculation of a three-dimensional position of a feature point based on triangulation has been described above, but the processing details which are performed by the side obstacle detection unit 106 are not limited thereto. For example, a method of converting an image into an image (an overhead view image) when surrounding environment is viewed just above using intrinsic and extrinsic parameters of the camera and detecting an obstacle on the basis of edges or the like in the overhead view image may be used.

In order to realize this modified example, it is necessary to add the following functions to the obstacle detection device 100. Examples thereof include cameras that image a forward view, a rearward view, a rightward view, and a leftward view of the vehicle, an overhead view image generating function of generating an overhead view image by combining images acquired from the cameras by imaging, and a function of detecting an obstacle in the front of the vehicle using the overhead view image.

In this case, it is also possible to reduce calculation costs by converting only the processing area C set by the processing area setting unit 105 into an overhead view image.

Modified Example 6

In the first embodiment, the processing area setting unit 105 calculates the distance between a parking space and the host vehicle and calculates a predicted area P of the parking space when the distance is equal to or less than a predetermined threshold value (YES in step S213 and S214 in FIG. 4). However, the operation of the processing area setting unit 105 is not limited thereto.

The processing area setting unit 105 may calculate relative position and posture between a parking space and the host vehicle and may calculate the predicted area P of the parking space in an image acquired from the side camera 102 by imaging without performing particular determination. That is, step S214 may be performed subsequently to step S211 in FIG. 4. In this case, it is determined whether an area of the predicted area P in the image is greater than a predetermined area, step S215 is performed when it is determined that the area is greater than the predetermined area, and step S217 is performed when it is determined that the area is equal to or less than the predetermined area.

The determination may be performed on the basis of the size of an area in which the predicted area P and the determination area A overlap each other.

According to Modified Example 6, the following operational advantages are obtained.

(1) The processing area setting unit 105 calculates an area of the parking space, that is, an area of the predicted area P, in the image acquired from the second camera, that is, the side camera 102, by imaging on the basis of the real-space area of the parking space stored in the memory unit and the information on behavior of the vehicle acquired by the motion acquisition unit, sets the processing area C when the calculated area is greater than a predetermined area, and causes the obstacle calculation unit, that is, the side obstacle detection unit 106, to perform the calculation.

Second Embodiment

An obstacle detection device according to a second embodiment of the invention will be described below with reference to FIGS. 8 and 9. In the following description, the same elements as in the first embodiment will be referenced by the same reference signs and differences therebetween will be described mainly. Elements which are not particularly described are the same as in the first embodiment. This embodiment is different from the first embodiment, in that a front obstacle detection unit is provided.

(Configuration)

The configuration of an obstacle detection device 100a is the same as in the first embodiment, except for a program which is stored in the ROM 11.

Figure 8:
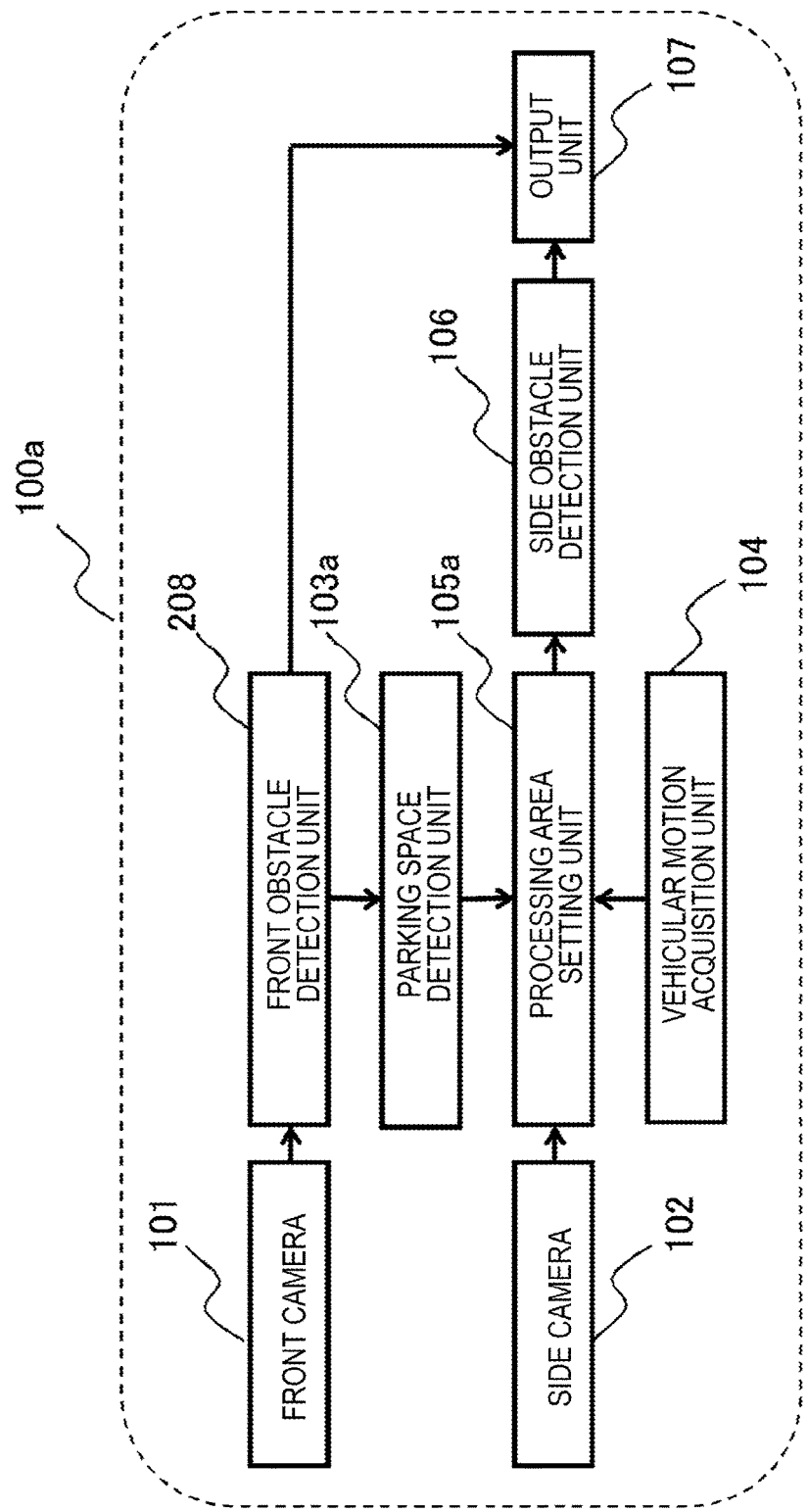
FIG. 8 is a functional block diagram illustrating functions of a program which is executed by an obstacle detection device 100a according to a second embodiment.

FIG. 8 is a functional block diagram illustrating functions of a program which is executed by an obstacle detection device 100a. Differences between the second embodiment and the first embodiment are as follows. The second embodiment includes a front obstacle detection unit 208 in addition to the functions of the obstacle detection device 100 according to the first embodiment. A processing area setting unit 105a is provided instead of the processing area setting unit 105. An image acquired from the front camera 101 by imaging is transmitted to the front obstacle detection unit 208, and the parking space detection unit 103a operates on the basis of processing results from the front obstacle detection unit 208. The output unit 107 receives an input from the front obstacle detection unit 208 as well as the side obstacle detection unit 106.

The front obstacle detection unit 208 detects an obstacle which is present in the front of the vehicle from a plurality of images acquired from the front camera 101 by imaging at different times, and outputs a position of the obstacle relative to the host vehicle. The processing of the front obstacle detection unit 208 is the same as the processing of the side obstacle detection unit 106, and a difference therebetween is that an image acquired from the front camera 101 by imaging is used instead of an image acquired from the side camera 102 by imaging. It is assumed that a processing area C is set in advance. For example, an overall image acquired from the front camera 101 may be set as the processing area C. When distortion of an image edge is large such as when an image is taken by a camera having a fish-eye lens mounted therein, the vicinity of the center of the image can be effectively set as the processing area C.

The output unit 107 outputs a position of an obstacle in the front of the vehicle which is detected by the front obstacle detection unit 208 and a position of an obstacle beside the vehicle which is detected by the side obstacle detection unit 106 to the CAN bus 20. As will be described later, only the position at which an obstacle has not been detected by the front obstacle detection unit 208 is subjected to the processing of the side obstacle detection unit 106.

Accordingly, the output unit 107 outputs an obstacle position output from the front obstacle detection unit 208 and an obstacle position output from the side obstacle detection unit 106 as they were.

(Operation of Processing Area Setting Unit 105a)

Process details of the processing area setting unit 105a will be described below with reference to FIGS. 9 and 10.

Figure 9:
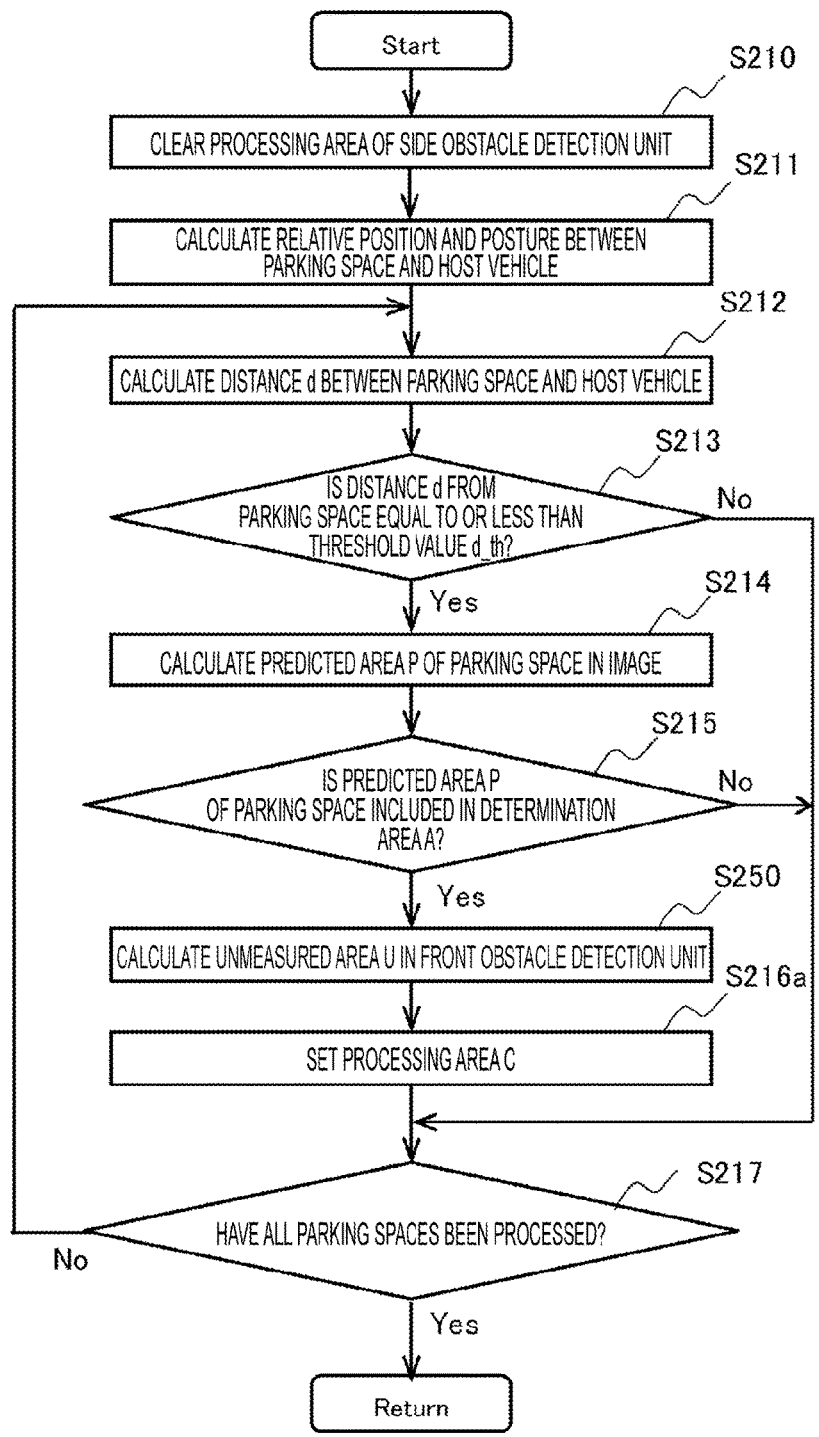
FIG. 9 is a flowchart illustrating a process routine which is performed by a processing area setting unit 105a according to the second embodiment.

FIG. 9 is a flowchart illustrating a process routine which is performed by the processing area setting unit 105a. This flowchart is different from the flowchart illustrated in FIG. 2 in the first embodiment, in processes up to step S217 after the determination of step S215 has been performed to be positive. The steps which will be described below are performed by the CPU 10.

In step S250 which is performed when the determination result of step S215 is YES, the front obstacle detection unit 208 which is implemented in the current process cycle calculates an unmeasured area U which is a real-space area which is present in the back of the obstacle and which could not be measured. That is, an area which is defined by the obstacle detected by the front obstacle detection unit 208 and which is more distant from the front camera 101 than the obstacle is the unmeasured area U. Then, step S216a is performed.

Figure 10:
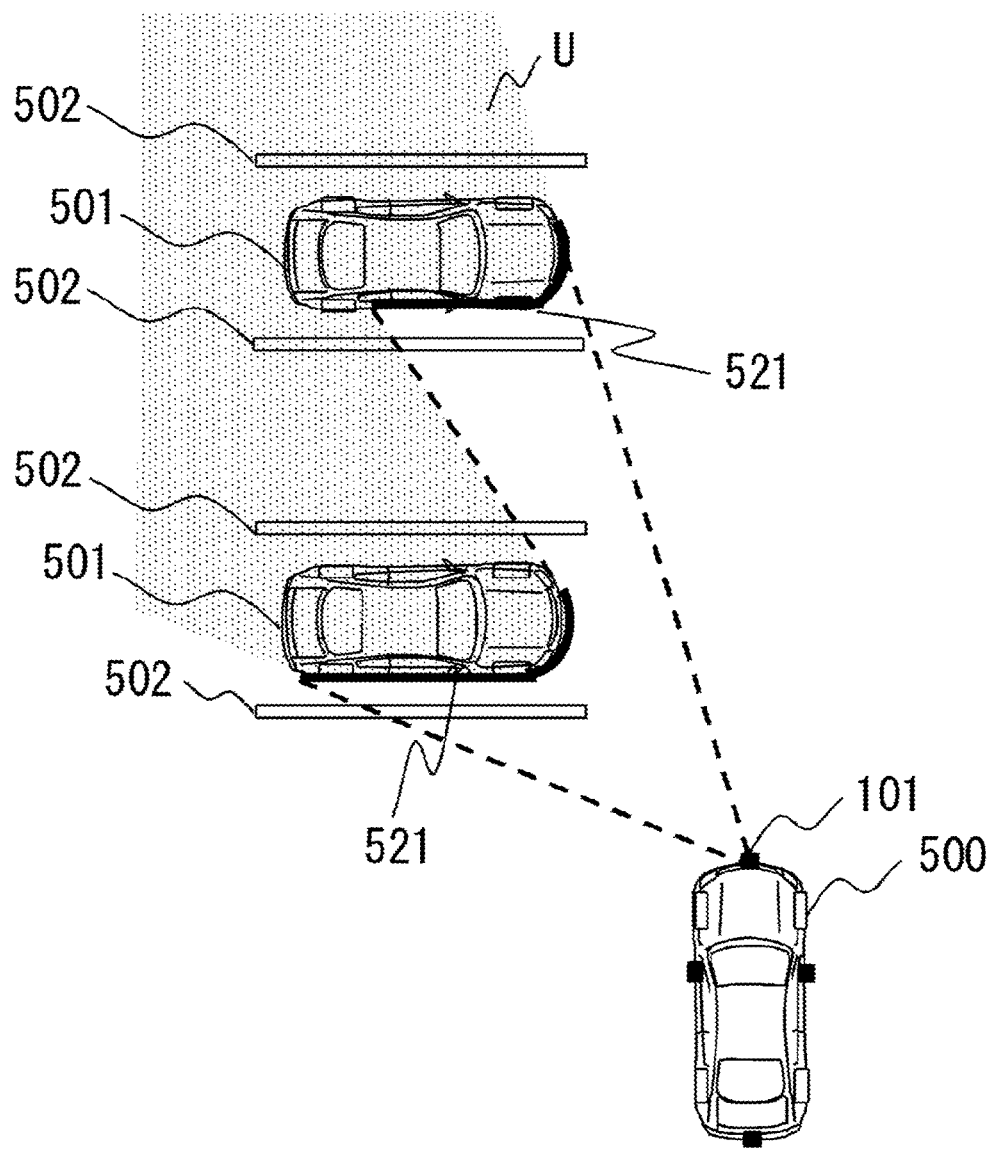
FIG. 10 is a diagram illustrating an example of an unmeasured area.

FIG. 10 is a diagram illustrating an example of an unmeasured area. FIG. 10 illustrates a state in which obstacles 521 present in front of the vehicle are detected using a plurality of images acquired from the front camera 101 by imaging at different times. At this time, since another obstacle is not considered to be present in an area between the front camera 101 and the obstacles 521, the area therebetween is a measured area and the other area is the unmeasured area U.

In step 216a, an area which is processed by the side obstacle detection unit 106 is set. That is, the unmeasured area U which is a real-space area calculated in step S215 is projected to an image acquired from the side camera 102 by imaging, and an unmeasured projection area W in the image is acquired. The unmeasured projection area W is set as an area which is processed by the side obstacle detection unit 106, that is, a processing area C. The relative position and posture between the unmeasured area U and the host vehicle and extrinsic and intrinsic parameters of the front camera 101 and the side camera 102 are used to calculate the unmeasured projection area W. Here, in consideration of a calculation error, an area which is broader than the unmeasured projection area W may be set as the processing area C. Then, step S217 is performed.

The operation of step S217 is the same as in the first embodiment.

The following operational advantages are obtained according to the second embodiment.

(1) The obstacle detection device 100 further includes a first camera image processing unit, that is, the front obstacle detection unit 208, configured to calculate information on an obstacle on the basis of a plurality of images which are acquired from the first camera, that is, the front camera 101, by imaging at different times. The parking space detection unit 103a detects the parking space on the basis of the calculation result of the front obstacle detection unit 208. The processing area setting unit 105a determines whether the obstacle calculation unit has to perform the calculation on the basis of whether the information on an obstacle is calculated by the front obstacle detection unit 208.

Accordingly, it is possible to reduce the calculation process load of the side obstacle detection unit 106 using the calculation result of the information on an obstacle from the front obstacle detection unit 208 which is implemented to detect the parking space. Specifically, when the information on an obstacle has been already calculated by the front obstacle detection unit 208, the processing area C is not set in the calculated area and it is thus possible to reduce the calculation process load of the side obstacle detection unit 106.

Modified Example 1 of Second Embodiment

In the second embodiment, the processing area setting unit 105a sets an area which could not be measured by the front obstacle detection unit 208 in the current process period as the unmeasured area U (step S250 in FIG. 9). However, an area which could not be measured by the front obstacle detection unit 208 in the previous process period as well as the current process period may be set as the unmeasured area U. That is, an area which was measured in the previous process period is corrected using a vehicle motion from the previous process period to the current process period which is output from the vehicular motion acquisition unit 104. An area which could not be measured in any process period is set as the unmeasured area U.

When the unmeasured area U is calculated, only the periphery of the parking space which is detected by the parking space detection unit 203 may be used as a calculation target to reduce calculation costs.

Modified Example 2 of Second Embodiment

The processing area setting unit 105a may divide a real space into grid areas with a predetermined size, for example, grid areas with each side of 1 m and may determine whether each grid area could be measured by the front obstacle detection unit 208. In this case, a grid area through which a straight line connecting an obstacle detected by the front obstacle detection unit 208 to a camera position passes is set to be measured.

According to this modified example, when a front or rear obstacle detected by the front obstacle detection unit 208 is a three-dimensional point group which is a group of three-dimensional positions of feature points, a measured area for the points is a line and thus it is possible to solve a problem in that a measured area is coarse.

Third Embodiment

An obstacle detection device according to a third embodiment of the invention will be described below with reference to FIGS. 11 to 13. In the following description, the same elements as in the first embodiment will be referenced by the same reference signs and differences therebetween will be described mainly. Elements which are not particularly described are the same as in the first embodiment. This embodiment is different from the first embodiment, in that both the front obstacle detection unit and the side obstacle detection unit calculate obstacle information for the same point and one piece of obstacle information is output on the basis of reliability.

(Configuration)

The configuration of an obstacle detection device 100b is the same as in the first embodiment, except for a program which is stored in the ROM 11.

Figure 11:
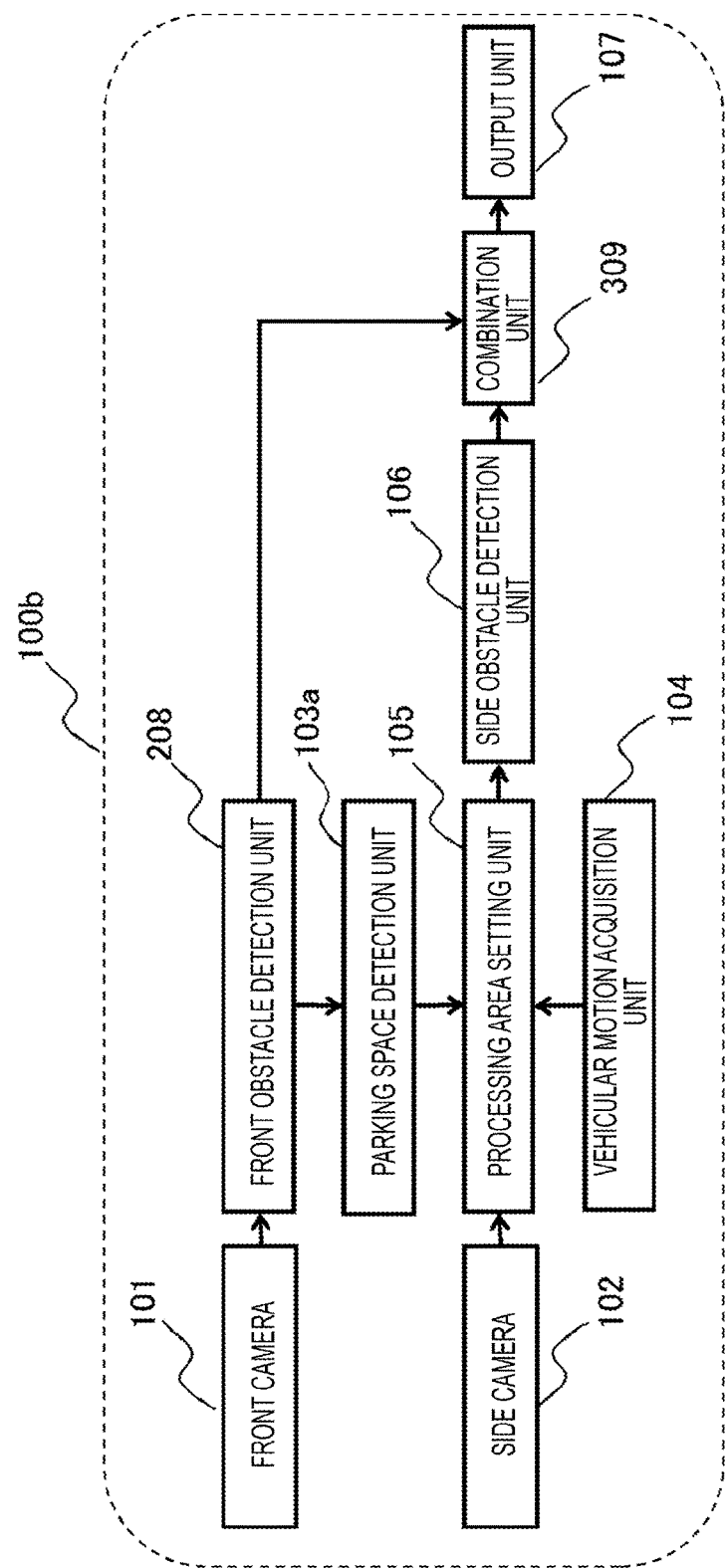
FIG. 11 is a functional block diagram illustrating functions of a program which is executed by an obstacle detection device 100b according to a third embodiment.

FIG. 11 is a block diagram illustrating the configuration of the obstacle detection device 100b according to the third embodiment. In the following description, only differences from the obstacle detection device 100 according to the first embodiment and the obstacle detection device 100a according to the second embodiment will be described in detail. The same elements will be referenced by the same reference signs and detailed description thereof will not be repeated. The differences between the third embodiment illustrated in FIG. 11 and the first embodiment are as follows. The third embodiment includes a front obstacle detection unit 208 and a combination unit 309 in addition to the functions of the obstacle detection device 100 according to the first embodiment.

The combination unit 309 combines a vehicle-front obstacle position detected by the front obstacle detection unit 208 and a vehicle-side obstacle position detected by the side obstacle detection unit 106 and outputs the combined result to the output unit 107.

(Processes of Combination Unit 309)

Process details of the combination unit 309 will be described below with reference to FIGS. 12 and 13.

Figure 12:
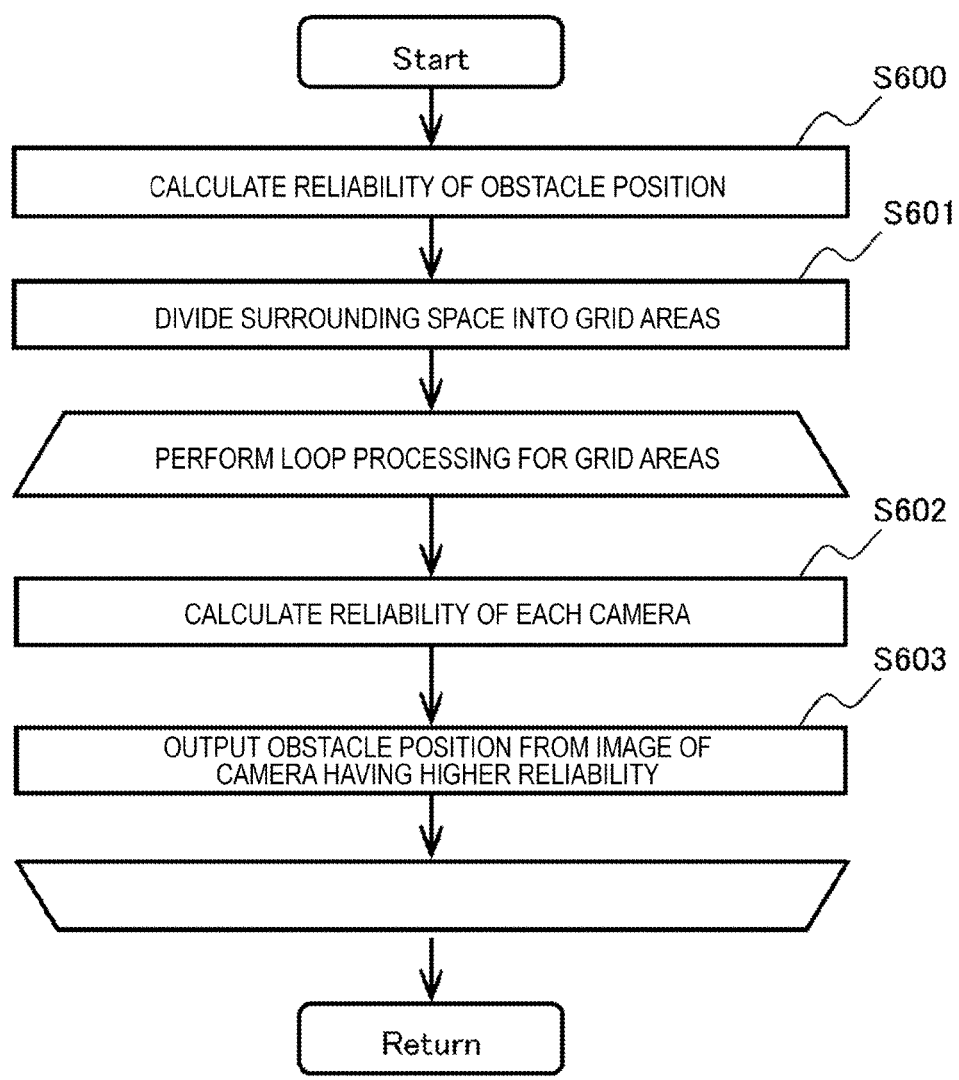
FIG. 12 is a flowchart illustrating a process routine which is performed by a combination unit 309.

FIG. 12 is a flowchart illustrating a process routine which is performed by the combination unit 309. The steps which will be described below are performed by the CPU 10.

In step S600, reliabilities of a vehicle-front obstacle position detected by the front obstacle detection unit 208 and a vehicle-side obstacle position detected by the side obstacle detection unit 106 are calculated. When an obstacle position is calculated on the basis of triangulation, the reliabilities are determined using a magnitude of parallax. Parallax refers to an angle which is formed by vectors form the obstacle position to camera positions corresponding to a plurality of images which are used to calculate an obstacle. The reliability is expressed, for example, by an integer from 0 to 100 for the purpose of easy comparison.

Figure 13:
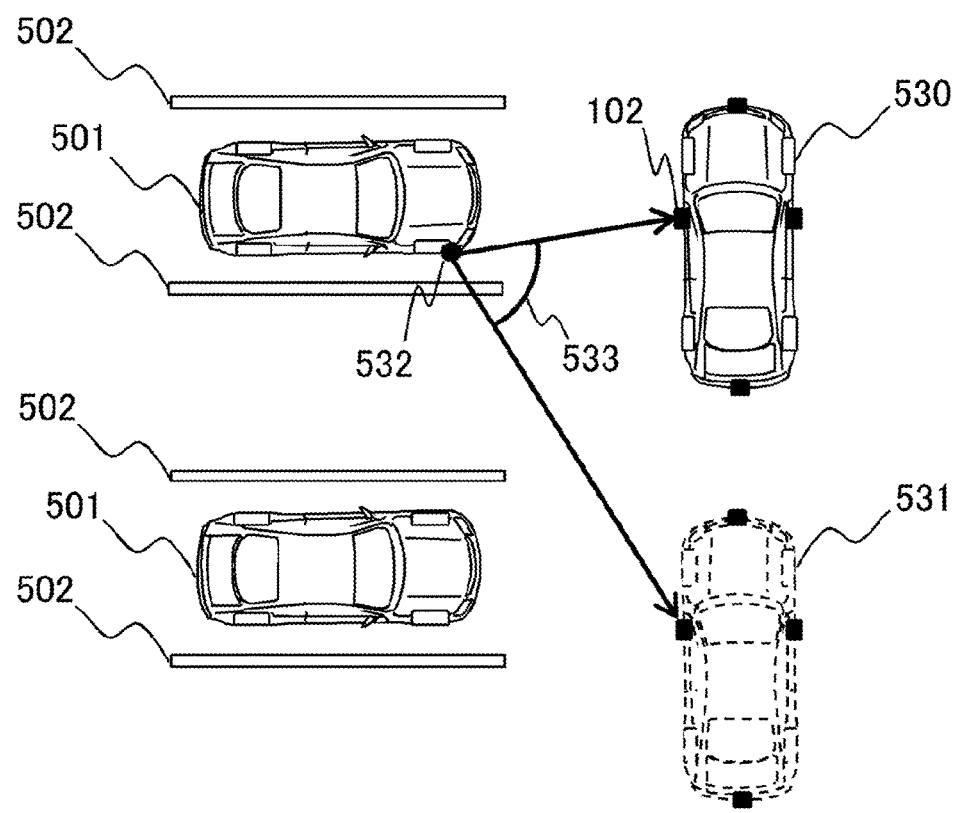
FIG. 13 is a diagram illustrating an example of parallax.

FIG. 13 is a diagram illustrating an example of parallax. In the example illustrated in FIG. 13, the side obstacle detection unit 106 outputs obstacle information at a position 532 by triangulation using a position 530 of the host vehicle in the current process period and a position 531 of the host vehicle in the previous process period. Here, parallax is calculated as an angle 533 which is formed by vectors from the position 532 to two camera positions which are used for the triangulation. When a position of an obstacle varies, the angle formed by the vectors to two camera positions varies and thus the reliability has different values depending on positions, that is, depending on obstacles. Then, step S601 is performed.

In step S601, a real space around the host vehicle is divided into grid areas. For example, a space of 10 m×10 m centered on the host vehicle is divided into 100 grid areas of 1 m×1 m. The surrounding space and the size of the grid areas may be arbitrarily changed. Then, step S602 is performed.

In step S602, reliabilities of the cameras are calculated from the reliabilities of obstacles which are present in a certain grid area. For example, an average of the reliabilities of obstacle positions which are measured from images of each camera is set as the reliability of the camera. A median value may be used instead of the average value. The obstacle position which is used to calculate the reliability of each camera is not limited to the obstacle position measured in the current process period, but an obstacle position measured in the previous process period may be used. Then, step S603 is performed.

In step S603, an obstacle position which his measured from an image of the camera having the higher reliability out of the front camera 101 and the side camera 102 in a certain grid area is output on the basis of the reliabilities calculated in step S602. For example, when there are two points with reliabilities of 10 and 20 as obstacle information acquired from the front camera 101 in a certain grid and there is one point with reliability of 20 as obstacle information acquired from the side camera 102, the following outputting is performed. That is, since the reliability of the front camera 101 is 15 which is an average value and the reliability of the side camera 102 is 20, only one point acquired from the front camera 101 is output as the obstacle information of the grid area.

Thereafter, steps S602 and S603 are performed on all the grid areas and the process routine of the combination unit 309 ends.

The following operational advantages are obtained according to the third embodiment.

(1) The obstacle detection device 100 further includes: the front obstacle detection unit 208 configured to calculate information on an obstacle on the basis of a plurality of images which are acquired from the front camera 101 by imaging at different times and the combination unit 309 configured to calculate reliability of the information on an obstacle which is calculated by the front obstacle detection unit 208 and reliability of the information on an obstacle which is calculated by the side obstacle detection unit 106 for each area obtained by dividing a real space into a grid shape and to output one piece of information on an obstacle having the higher reliability calculated for the corresponding area to the output unit 107. The parking space detection unit 103 detects the parking space on the basis of the calculation result of the front obstacle detection unit 208.

Accordingly, the obstacle information having the higher reliability out of the obstacle information acquired from the images of the front camera 101 and the side camera 102 can be output. Since which of the front camera 101 and the side camera 102 can accurately calculate obstacle information varies depending on steering of the vehicle 500 or a positional relationship between the vehicle 500 and an obstacle, this method is effective.

(2) The side obstacle detection unit 106 and the front obstacle detection unit 208 calculate the information on an obstacle on the basis of two images and a principle of triangulation. The combination unit 309 calculates the reliability of the information on an obstacle which is calculated by the front obstacle detection unit 208 on the basis of an angle which is formed by two straight lines connecting a real-space position of the obstacle and real-space positions of the front camera 101 when the two images are captured, and calculates the reliability of the information on an obstacle which is calculated by the side obstacle detection unit 106 on the basis of an angle which is formed by two straight lines connecting a real-space position of the obstacle and real-space positions of the side camera 102 when the two images are captured.

Accordingly, it is possible to calculate reliabilities by simple calculation.

Modified Example of Third Embodiment

The process routine of the combination unit 309 is not limited to the above description.

The combination unit 309 may output a vehicle-front obstacle position output from the front obstacle detection unit 208 and a vehicle-side obstacle position output from the side obstacle detection unit 106 regardless of the reliability or without calculating the reliability.

The combination unit 309 may calculate the reliability on the basis of the number of obstacles, that is, the number of correlated points, instead of the parallax. That is, the combination unit 309 compares the number of obstacles in a certain grid area detected by the front obstacle detection unit 208 and the number of obstacles in the grid area detected by the side obstacle detection unit 106. When the front obstacle detection unit 208 detects more obstacles, the combination unit 309 outputs obstacle information detected by the front obstacle detection unit 208 as the obstacle information for the grid area. When the side obstacle detection unit 106 detects more obstacles, the combination unit 309 outputs obstacle information detected by the side obstacle detection unit 106 as obstacle information for the grid area.

Fourth Embodiment

An obstacle detection device according to a fourth embodiment of the invention will be described below with reference to FIGS. 14 and 15. In the following description, the same elements as in the third embodiment will be referenced by the same reference signs and differences therebetween will be described mainly. Elements which are not particularly described are the same as in the third embodiment. This embodiment is different from the third embodiment, mainly in that a parking space is detected using obstacle detection results output from the obstacle detection device.

(Configuration)

The configuration of an obstacle detection device is the same as in the third embodiment. The vehicle 500 further includes a parking space post-process detection unit in addition to the configuration of the third embodiment.

Figure 14:
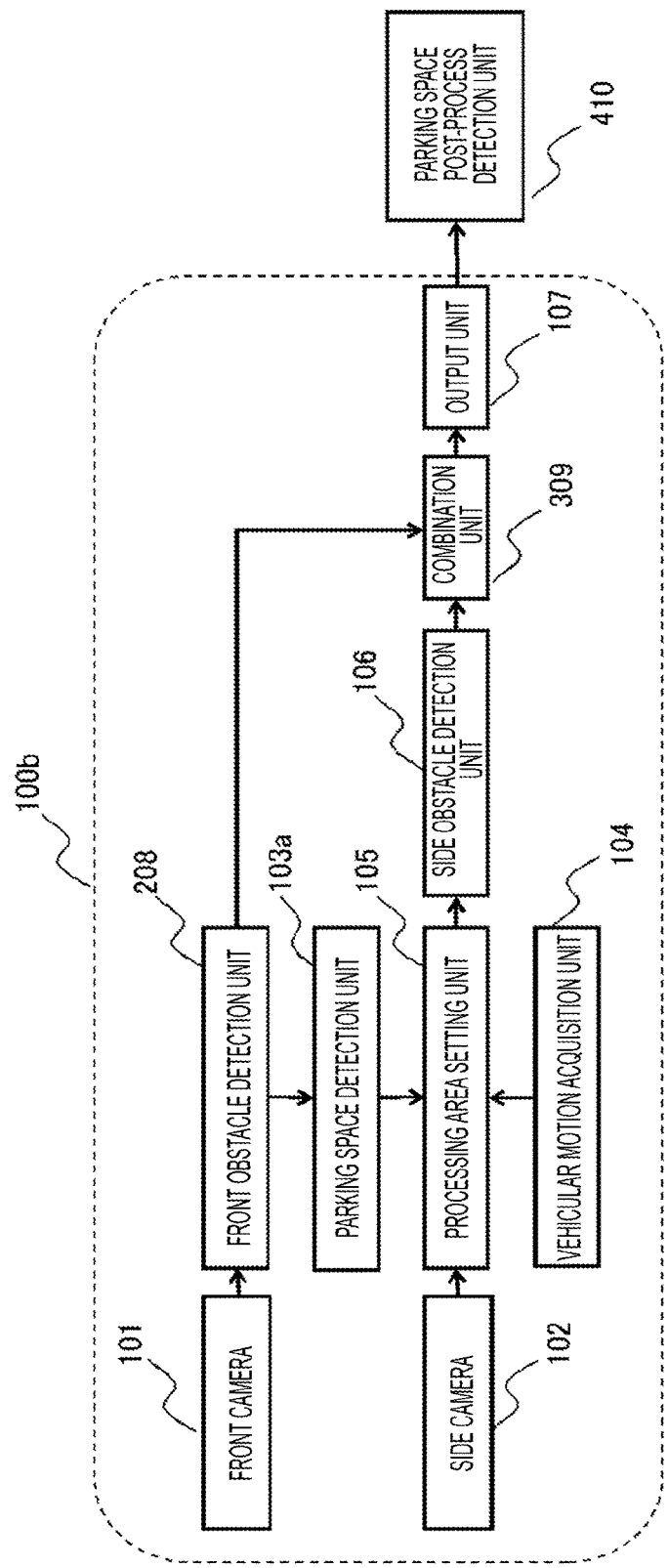
FIG. 14 is a functional block diagram illustrating functions of a program which is executed in a vehicle 500 according to a fourth embodiment.

FIG. 14 is a functional block diagram illustrating functions of a program which is executed by the vehicle 500 according to the fourth embodiment. The parking space post-process detection unit 410 represents a function of a program which is executed by an ECU connected to the CAN bus 20 (see FIG. 1), as a functional block. The parking space post-process detection unit 410 receives obstacle detection results from the obstacle detection device 100b via the CAN bus 20 and detects a parking space which is present near the host vehicle.

(Parking Space Post-Process Detection Unit)

Process details of the parking space post-process detection unit 410 will be described below with reference to FIG. 15.

Figure 15:
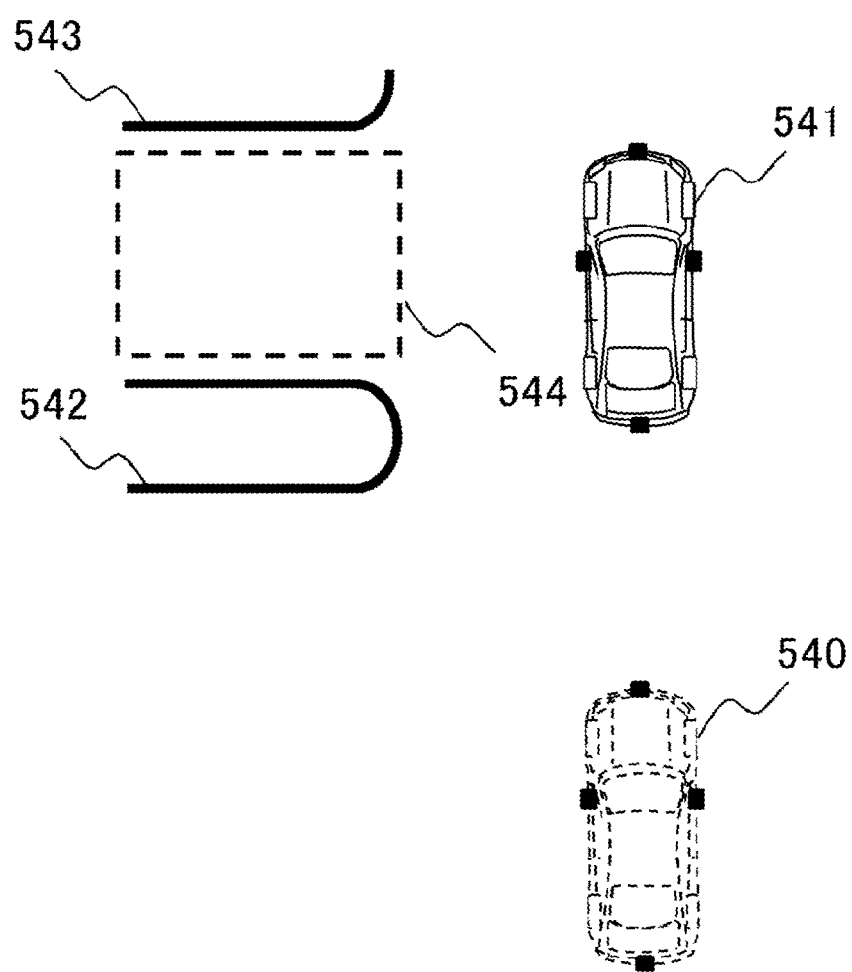
FIG. 15 is a diagram illustrating a process routine which is performed by a parking space post-process detection unit 410.

FIG. 15 is a diagram illustrating an example of a parking space which is detected by the parking space post-process detection unit 410. In this example, when the host vehicle moves from a position 540 in the previous process period to a position 541 in the current process period, obstacle positions 542 and 543 are acquired by the obstacle detection device 100b. When a space in which no obstacle is present is between a plurality of obstacle positions, the parking space post-process detection unit 410 detects the space in which no obstacle is present as a parking space. In the example illustrated in FIG. 15, a space 544 between the obstacle positions 542 and 543 is detected as a parking space.

According to the fourth embodiment, it is possible to detect a parking space which is present near the host vehicle and in which no obstacle is present.

Modified Example 1 of Fourth Embodiment

In the fourth embodiment, the parking space post-process detection unit 410 detects a space in which no obstacle is present between a plurality of obstacles as a parking space, but the method of detecting a parking space is not limited thereto.

The parking space post-process detection unit 410 may detect an overall space in which no obstacle is present as a parking space.

The parking space post-process detection unit 410 may define a minimum parking space size in advance and detect only a space which is larger than the minimum parking space size and in which no obstacle is present as a parking space.

The parking space post-process detection unit 410 may detect a parking area such as white lines from an image acquired from the front camera 101 by imaging a forward view or rearward view of the vehicle and an image acquired from the side camera 102 by imaging a sideward view and detect a position of the parking area in which no obstacle is present as a parking space.

The parking space post-process detection unit 410 may correct an obstacle position in the previous process period using a vehicle motion from the previous process period to the current process period which is output from the vehicular motion acquisition unit 104, add the corrected obstacle position to the obstacle position in the current process period, and use the resultant as an obstacle position.

Modified Example 2 of Fourth Embodiment

In the fourth embodiment, the parking space post-process detection unit 410 is a function of an ECU which is different from the obstacle detection device 100b. However, the obstacle detection device 100b may include the parking space post-process detection unit 410 and output the detected position of a parking space along with the obstacle detection result.

The invention is not limited to the above-mentioned embodiments and includes various modified examples. For example, the embodiments are described in detail for the purpose of easy understanding of the invention, and are not limited to embodiments including all the elements which are described above. Other aspects which are considered to be within the scope of the technical concept of the invention are included in the scope of the invention. Some of the elements in a certain embodiment can be replaced with elements in another embodiment, and elements of a certain embodiment can also be added to elements of another embodiment. Addition, deletion, or replacement of some elements can be carried out on some elements of the embodiments. Some or all of the above-mentioned elements, functions, processing units, processing means, and the like may be embodied in hardware, for example, by designing an integrated circuit. The elements, functions, and the like may be embodied in software by causing a processor to construe and execute programs for implementing the functions. Information such as programs, tables, and files for implementing the functions can be stored in a recording device such as a memory, a hard disk, or a solid state drive (SSD) or a recording medium such as an IC card, an SD card, or a DVD.

Contents of the following patent application based on priority are incorporated by reference herein.

Japanese Patent Application No. 2015-215752 (field on Nov. 2, 2015)

REFERENCE SIGNS LIST

A determination area
C processing area
P predicted area

U unmeasured area
12a parking space information area
100 obstacle detection device
101 front camera
102 side camera
103, 103a parking space detection unit
104 vehicular motion acquisition unit
105 processing area setting unit
106 side obstacle detection unit
208 front obstacle detection unit
309 combination unit
500 vehicle.

The invention claimed is:

1. An obstacle detection device incorporated in a vehicle comprising:
   a first camera mounted in the vehicle and configured to image a forward view or a rearward view of the vehicle;
   a second camera mounted in the vehicle and configured to image a sideward view of the vehicle;
   a parking space detection circuit configured to detect a parking space for the vehicle on a basis of an image acquired from the first camera by imaging;
   a memory circuit configured to store a real-space area of the parking space detected by the parking space detection circuit;
   a motion acquisition circuit configured to acquire information on behavior of the vehicle;
   an obstacle calculation circuit configured to calculate information on an obstacle which is present near the parking space on a basis of a plurality of images which are acquired from the second camera by imaging at different times; and
   a processing area setting circuit configured to control the calculation in the obstacle calculation circuit on a basis of the real-space area of the parking space stored in the memory circuit and the information on behavior of the vehicle acquired by the motion acquisition circuit, wherein the real-space area is an area covering all surrounding areas of the obstacle present near the parking space and not measured by the parking space detection circuit but projected from the image acquired from the first camera.

2. The obstacle detection device according to claim 1, wherein the processing area setting circuit:
   calculates a real-space distance between the parking space and the vehicle on a basis of the real-space area of the parking space stored in the memory circuit and the information on behavior of the vehicle acquired by the motion acquisition circuit and determines that the obstacle calculation circuit does not perform the calculation when the real-space distance is greater than a predetermined distance.

3. The obstacle detection device according to claim 1, wherein the processing area setting circuit:
   calculates an area of the parking space in the plurality of images acquired from the second camera by imaging on a basis of the real-space area of the parking space stored in the memory circuit and the information on behavior of the vehicle acquired by the motion acquisition circuit and determines to cause the obstacle calculation circuit to perform the calculation when the calculated area of the parking space is greater than a predetermined area.

4. The obstacle detection device according to claim 1, wherein the processing area setting circuit:
   calculates an area of the parking space in the plurality of images acquired from the second camera by imaging on a basis of the real-space area of the parking space stored in the memory circuit and the information on behavior of the vehicle acquired by the motion acquisition circuit; and
   determines whether the obstacle calculation circuit has to perform the calculation on a basis of a relationship between the area of the parking space in the plurality of images and a predetermined determination area in the plurality of images.

5. The obstacle detection device according to claim 4, wherein the processing area setting circuit causes the obstacle calculation circuit to perform the calculation using image information with luminance included in the determination area in the image acquired from the second camera by imaging when at least a part of the calculated area of the parking space in the image acquired from the second camera by imaging is included in the determination area.

6. The obstacle detection device according to claim 5, wherein the processing area setting circuit causes the obstacle calculation circuit to perform the calculation using image information with luminance included in an area in which the determination area and the area of the parking space overlap each other in the image acquired from the second camera by imaging when at least a part of the calculated area of the parking space in the image acquired from the second camera by imaging is included in the determination area.

7. The obstacle detection device according to claim 1, further comprising a first camera image processing circuit configured to calculate information on the obstacle on a basis of a plurality of images which are acquired from the first camera by imaging at different times,
   wherein the parking space detection circuit detects the parking space on a basis of the calculation result of the first camera image processing circuit, and
   wherein the processing area setting circuit determines whether the obstacle calculation circuit has to perform the calculation additionally on a basis of whether the information on the obstacle is calculated by the first camera image processing circuit.

8. The obstacle detection device according to claim 1, further comprising:
   a first camera image processing circuit configured to calculate information on the obstacle on a basis of a plurality of images which are acquired from the first camera by imaging at different times; and
   a combination circuit configured to calculate reliability of the information on the obstacle which is calculated by the first camera image processing circuit and reliability of the information on the obstacle which is calculated by the obstacle calculation circuit for each area obtained by dividing the real space area into a grid shape and to output an image having the higher reliability in the real-space area,
   wherein the parking space detection circuit detects the parking space on a basis of the calculation result of the first camera image processing circuit.

9. The obstacle detection device according to claim 8, wherein:
   the obstacle calculation circuit and the first camera image processing circuit calculate the information calculated by the first camera image processing circuit on the obstacle on a basis of two images and a principle of triangulation, and
   wherein the combination circuit:
   calculates the reliability of the information on the obstacle which is calculated by the first camera image processing circuit on a basis of an angle which is formed by two straight lines connecting a real-space position of the obstacle and real-space positions of the first camera when the two images are captured, and calculates the reliability of the information on the obstacle which is calculated by the obstacle calculation circuit on a basis of an angle which is formed by two straight lines connecting a real-space position of the obstacle and real-space positions of the second camera when the two images are captured.

\* \* \* \* \*